United States Patent Office 3,546,250
Patented Dec. 8, 1970

3,546,250
6-HYDROXY-7-METHOXY FLAVANE DERIVATIVES AND ESTERS THEREOF
Josef Krämer, Klaus Irmscher, Herbert Halpaap, and Karl-Otto, Freisberg, Darmstadt, Germany, assignors to E. Merck A.G., Darmstadt, Germany
No Drawing. Filed July 27, 1967, Ser. No. 656,348
Claims priority, application Germany, Aug. 18, 1966, M 70,625
Int. Cl. C07d 13/10
U.S. Cl. 260—340.5    15 Claims

ABSTRACT OF THE DISCLOSURE

Agents for lowering the cholesterol level with little or no estrogenic effect, or build-up of desmosterol or 7-dehydrocholesterol, said agent being compounded of the following formula, esters and ester salts thereof:

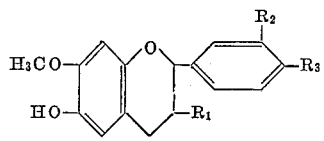

wherein:
$R_1$ represents alkyl or alkoxy of 1–3 carbon atoms, respectively;
$R_2$ is hydrogen;
$R_3$ is hydrogen or alkoxy of 1–5 carbon atoms; and
wherein $R_2$ and $R_3$ together can also represent methylenedioxy.

---

This invention relates to flavane derivatives, and in particular to 6-hydroxy-7-methoxy flavanes and esters thereof.

Whereas there are several drugs known to lower the cholesterol level in mammals, such utility has been generally associated with an enrichment of desmosterol or 7-dehydrocholesterol in the serum. Furthermore, some of these drugs exhibited undesired estrogenic activities.

Objects of the invention, therefore, are to provide novel compounds, methods of producing same, novel pharmaceutical compositions, and methods of lowering the cholesterol level in mammals, while minimizing the undesired side effects attributable to prior drugs.

Upon further study of the specification and claims, other objects and advantages of the present invention will become apparent.

To attain these objects, there are provided flavane derivatives of Formula I, as well as the esters and ester salts thereof:

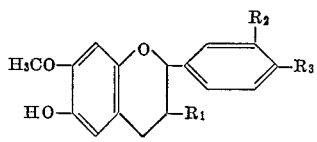

I wherein:
$R_1$ represents alkyl or alkoxy of 1–3 carbon atoms, respectively;
$R_2$ is hydrogen;
$R_3$ is hydrogen or alkoxy of 1–5 carbon atoms; and
wherein $R_2$ and $R_3$ together can also represent methylenedioxy.

These compounds possess valuable pharmacological properties. In particular, they exhibit cholesterol-level-lowering effects, with little or no estrogenic effects.

For example, the oral administration of 25 mg./kg. of such compounds to rats (method—see Counsell et al., J. Med. Pharm. Chem., vol. 5, pp. 720 and 1224, 1962), resulted in the following reductions of the cholesterol level in the serum:

|  | Percent |
|---|---|
| 3,7,4'-trimethoxy-6-acetoxy-flavane | 39 |
| 3-ethyl-6-acetoxy-7-methoxy-flavane | 18 |
| 3-n-propyl-6-acetoxy-7-methoxy-flavane | 17 |
| 3-methyl-6-hydroxy-7,4'-dimethoxy-flavane | 13 |

As compared to known cholesterol-level-lowering substances, such as 20,25 - diazacholesterol, 22,25 - diazacholesterol, 25-azacholesterol, 3β-diethylaminoethoxy-5-androsten - 17 - one, 1-p-(2-diethylaminoethoxy)-phenyl-1-p-tolyl-2-p-chlorophenyl-ethanol, and trans-1,4-bis-(2-chlorobenzylaminomethyl)-cyclohexane, the compounds obtained according to this invention are distinguished by the fact that, after they have been administered, there is no non-physiological accumulation of desmosterol or 7-dehydrocholesterol in the sterols of the serum; and thus the total content of sterols in the serum is lowered.

As compared to the corresponding compounds unsubstituted in the 7-position, the 7-methoxy-compounds obtainable according to this invention exhibit a substantially lower estrogenic effect. Thus, the following percentages of castrated female Wistar rats exhibited a full estrus after a single oral treatment with respectively 10 mg./100 g. of the substances set out below (for the method, see Allen and Doisy, J. Amer. Med. Assoc., vol. 81, p. 819, 1923):

|  | Corresponding 7-methoxy-compounds, percent |
|---|---|
| 3-ethyl-6-acetoxy-4'-methoxy-flavane (100%) | 0 |
| 3-methyl-6-hydroxy-4'-methoxy-flavane (100%) | 0 |
| 3-ethyl-6-hydroxy-flavane (100%) | [1] 0 |
| 3-n-propyl-6-hydroxy-flavane (100%) | [1] 0 |
| 3,4'-dimethoxy-6-acetoxy-flavane (100%) | 50 |

[1] As the 6-acetate.

The flavane derivatives of Formula I are prepared by a process wherein a compound of Formula II

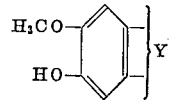

II wherein Y is

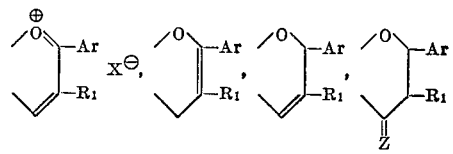

or

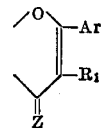

Ar being $$\begin{array}{c} R_2 \\ -\!\!\!\bigcirc\!\!\!-R_3 \end{array}$$

$X^{\ominus}$ is an anion of a strong acid;
Z represents H, OH or =O; and
$R_1$ to $R_3$ have the above-indicated meanings; and
wherein the phenolic hydroxy group can also be present as a functionally modified form, is reacted with hydrogen in the presence of a heavy metal catalyst. If desired, in a thus-obtained compound, a functionally modified hydroxy group is liberated by treatment with hydrolyzing agents. Conversely, a free hydroxy group can be esterified, or any thus-obtained acidic or basic ester can be converted into an ester salt.

The residue $R_1$ and the phenyl group in the 2-position can be in a cis- or trans-position with respect to each other, so that the compounds of Formula I can occur in two stereoisomeric forms. Unless noted otherwise, these two substituents in the above-mentioned compounds are in cis-position with respect to each other.

$R_3$ can represent, in addition to hydrogen, the following, for example: methoxy, ethoxy, n-propoxy, isopropoxy, butoxy, isobutoxy, sec.-butoxy, tert.-butoxy, n-amyloxy, or isoamyloxy.

Particularly suitable esters are carboxylic acid esters having an acyl residue of 1–6 carbon atoms, for example, the formiates, acetates, propionates, butyrates, isobutyrates, valerates, isovalerates, trimethylacetates, capronates, isocapronates, picolinates, nicotinates, isonicotinates, diethylaminoacetates, and the acid addition salts thereof, particularly the hydrochlorides thereof. Particularly preferred esters are the acetates. Furthermore, of special importance are the sulfuric acid and phosphoric acid esters, as well as the physiologically acceptable ester salts derived therefrom, for example, the sodium, ammonium, and substituted ammonium salts, since they constitute water-soluble, thus therapeutically especially readily administrable derivatives of the compound of Formula I.

The compounds of Formula II comprise flavylium salts, 2- or 3-flavenes, flavanones, flavanols, or flavones which can be substituted as set forth above. The flavylium salts of Formual II can contain anions of any strong acid. Preferably, said anions are chlorides, but they can also be present in the form of bromides, iodides, perchlorates, tetrachloroferrates (III) or hydrogen sulfates, among others.

Suitable catalysts for the hydrogenation of the compounds of Formula II are, for example, copper-chromium oxide, noble metal, nickel, and cobalt catalysts. The noble metal catalysts can be in the form of supported catalysts (e.g., palladium on charcoal, calcium carbonate, or strontium carbonate), oxide catalysts (e.g., platinum oxide), or finely divided metal catalysts. Nickel and cobalt catalysts are suitably employed in the form of Raney metals, and nickel is also used supported on kieselguhr or pumice as the carrier.

The hydrogenation can be conducted at room temperature and atmospheric pressure, or also at elevated temperature and/or elevated pressure. It is preferred to employ pressures of 1–100 atmospheres absolute, and temperatures between —80° and +150° C., inclusive. The reaction is advantageously conducted in the presence of a solvent, such as methanol, ethanol, isopropanol, tert.-butanol, ethyl acetate, dioxane, glacial acetic acid, tetrahydrofuran, water, or mixtures of the same. In some cases, it is recommended to add catalytic amounts of a mineral acid, e.g., hydrochloric or sulfuric acid. If starting products of Formula II are employed wherein phenolic hydroxy groups are protected by benzyl groups, these protective groups can be removed during the hydrogenation.

A particularly preferred process embodiment resides in the catalytic hydrogenation of the flavylium chlorides on platinum or palladium catalysts in methanol, at room temperature and atmospheric pressure.

The starting compounds of Formula II can be obtained by conventional methods. For example, the flavylium salts can be produced by condensation of a 2,5-dihydroxy-4-methoxy-benzaldehyde, optionally esterified in the 5-position, with a ketone of the formula $R_1CH_2COAr$. The 2-flavenes can be prepared by splitting off alcohol from the corresponding 2-alkoxyflavenes; the 3-flavenes by reducing the corresponding flavylium salts with lithium aluminum hydride; and the flavanones by condensation of a 2,5-dihydroxy-4-methoxy-acetophenone, optionally esterified in the 5-position, with an aldehyde of the formula ArCHO. The flavanols can be produced by the reduction of the corresponding flavanones; the flavones can be produced from the flavanones by dehydrogenation with selenium dioxide or by oxidation with hydrogen peroxide in an alkaline solution ;and the 2-flavenols are prepared by reducing the corresponding flavones with lithium aluminum hydride.

Preferred starting compounds are the novel flavylium chlorides of the formula

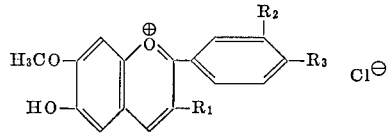

wherein $R_1$ to $R_3$ have the above-indicated meanings.

The following compounds are employed, for example, as the starting compounds of Formula II:

3-methyl-6-hydroxy-7-methoxy-flavylium chloride,
3-methyl-6-hydroxy-7,4'-dimethoxy-flavylium chloride,
3-methyl-6-hydroxy-7-methoxy-3',4'-methylenedioxy-flavylium chloride,
3-methyl-6-hydroxy-7-methoxy-2- and (-3-flavene, flavanone, and -flavone,
3-methyl-6-hydroxy-7,4'-dimethoxy-2- and -3-flavene, -flavanone, and -flavone,
3-methyl-6-hydroxy-7-methoxy-3',4'-methylenedioxy-2- and -3-flavene, -flavanone, and -flavone,
3-methyl-4,6-dihydroxy-7-methoxy-flavane,
3-methyl-4,6-dihydroxy-7,4'-dimethoxy-flavane,
3-methyl-4,6-dihydroxy-7-methoxy-3',4'-methylenedioxy-flavane, and the corresponding 6-acrylates, particularly the 6-acetates, as well as the analogous 3-ethyl-, 3-n-propyl-, 3 - isopropyl-, 3 _ methoxy-, 3 - ethoxy-, 3-n-propoxy-, and 3-isopropoxy-compounds.

It is possible for the phenolic hydroxy group of a compound of Formula II to be present in a functionally modified form, for example, etherified or esterified. Hydrogenolyzable functional groups (e.g., benzyl, diphenylmethyl, or triphenylmethyl ethers) are split during the hydrogenation of this invention, the hydroxy group being liberated in this step.

A functionally modified 6-hydroxy group in the product obtained by the hydrogenation of a compound of Formula II can (or must, if an ether is involved) be liberated by treatment with hydrolyzing agents. For example, tetrahydropyranyl-(2)-oxy-compounds can be split with acids, and esters (e.g., acetates, propionates, benzoates, methane- or p-toluenesulfonates) can be hydrolyzed in a basic, neutral, or acidic medium. Preferred bases are aqueous, aqueous-alcoholic, or alcoholic sodium or potassium hydroxide; preferred acids are, in particular, hydrochloric acid and sulfuric acid.

In the thus-obtained products, a free hydroxy group can be optionally esterified. An acylation of the phenolic hydroxy group can be conducted, for instance, by treatment with an anhydride or acyl halide of acetic, propionic, butyric, isobutyric, valeric, isovaleric, trimethylacetic, capronic, nicotinic, isonicotinic, or picolinic acid, preferably in the presence of a base, such as pyridine, or an alkali salt of the corresponding acid, or also a small amount of a mineral acid, such as sulfuric or hydrochloric acid. The reaction can be conducted at ambient or elevated temperatures.

For producing the sulfuric acid and phosphoric acid esters of the compounds of Formula I, the latter are reacted with sulfuric acid, phosphoric acid, or a derivative of these acids suitable for esterification, the methods employed in this connection being those described in the literature. It is likewise possible to conduct the reaction with a sulfuric acid or phosphoric acid derivative wherein one or two hydroxy groups are protected, and in the resultant esters to remove the protective groups by hydrolysis or hydrogenolysis. Finally, the thus-obtained sulfuric acid or phosphoric acid esters can be converted into physiologically compatible metal or ammonium salts thereof by treatment with bases.

The preferred classes of compounds and the esters or ester salts thereof are as follows (wherein, unless otherwise indicated, $R_2$ and $R_3$ have the above-indicated meanings):

(A) Compounds of Formula I wherein $R_1$ represents alkyl of 1–3 carbon atoms;
(B) Compounds of Formula I wherein $R_1$ represents alkoxy of 1–3 carbon atoms;
(C) Compounds of Formula I wherein $R_1$ represents alkyl of 1–3 carbon atoms, and $R_3$ represents hydrogen, methoxy, or together with $R_2$, methylenedioxy;
(D) Compounds of Formula I wherein $R_1$ represents alkoxy of 1–3 carbon atoms, and $R_3$ represents hydrogen, methoxy, or together with $R_2$, methylenedioxy.

The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, vaseline, etc.

For parenteral application, particularly suitable are solutions, preferably oily or aqueous solutions, as well as suspensions, emulsions, or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The novel flavane derivatives are preferably administered to mammals in dosages of 1 to 500 mg. per dosage unit. Generally, the amount of carrier is about 1–5,000 mg.

Without further elaboration, it is believed that one skilled in the art can, using the preceding description, utilize the present invention to its fullest extent. The following preferred specific embodiments are, therefore, to be construed as merely illustrative, and not limitative of the remainder of the specification in any way whatsoever.

EXAMPLE 1

Platinum dioxide (2.5 g.) is subjected to a preliminary hydrogenation in 700 ml. methanol and then mixed with 33.3 g. 3-methyl-6-hydroxy-7,4'-dimethoxyflavylium chloride. The hydrogenation is then continued until 2 mols of hydrogen is absorbed; 35 ml. pyridine is added, the platinum filtered off under a nitrogen atmosphere, and the filtrate is evaporated to dryness under reduced pressure. The residue is recrystallized from methanol. There is obtained 3 - methyl - 6-hydoxy-7,4'-dimethoxy-flavane, M.P. 139–140° C.

EXAMPLE 2

Analogously to Example 1, 34.8 g. 3-methyl-6-hydroxy 7 - methoxy - 3',4' - methylenedioxy-flavylium chloride in methanol is hydrogenated on platinum dioxide and worked up after the addition of pyridine. The thus-obtained oily crude 3-methyl-6-hydroxy-7-methoxy-3',4'-methylenedioxy-flavane is heated with 150 ml. pyridine and 150 ml. acetic anhydride for 5 hours to 50° C. After cooling, the reaction mixture is poured on ice, extracted several times with chloroform, and the chloroform phase is washed several times with dilute hydrochloric acid and with water. Then, the chloroform is distilled off, and the thus-obtained 3-methyl-6-acetoxy-7-methoxy - 3',4' - methylenedioxy-flavane is recrystallized from methanol; M.P. 139–142° C.

In an analogous manner, the following crude 6-hydroxy-flavanes are obtained by the hydrogenation of the corresponding flavylium chlorides:

3-ethyl-7-methoxy-
3,7,4'-trimethoxy-
3-methyl-7-methoxy-
3,7-dimethoxy-
3-n-propyl-7-methoxy-3',4'-methylenedioxy-
3-ethyl-7,4'-dimethoxy-
3,7-dimethoxy-3',4'-methylenedioxy-
3-n-propyl-7-methoxy-
3-ethoxy-7-methoxy-
3-ethoxy-7,4'-dimethoxy-, and
3-ethoxy-7-methoxy-3',4'-methylenedioxy-.

A subsequent acetylation, wherein the crude product can be purified by an additional chromatography on silica gel, results in the following compounds:

3-ethyl-6-acetoxy-7-methoxy-flavane, M.P. 125–127° C.
3,7,4'-trimethoxy-6-acetoxy-flavane, M.P. 116–118° C.
3-methyl-6-acetoxy-7-methoxy-flavane, M.P. 108–110° C.
3,7-dimethoxy-6-acetoxy-flavane, M.P. 168–170° C.
3-n-propyl-6-acetoxy-7 - methoxy - 3',4'-methylenedioxy-flavane, M.P. 122–124° C.
3-ethyl-6-acetoxy-7,4'-dimethoxy-flavane, M.P. 84–85° C.
3,7-dimethoxy-6-acetoxy - 3',4' - methylenedioxy-flavane, M.P. 145–147° C.
3-n-propyl-6-acetoxy-7-methoxy-flavane, M.P. 98–101° C.
3-ethoxy-6-acetoxy-7-methoxy-flavane, M.P. 128–130° C.
3-ethoxy-6-acetoxy-7,4'-dimethoxy-flavane, M.P. 104–106° C.
3-ethoxy-6-acetoxy-7-methoxy - 3',4'-methylenedioxy-flavane, M.P. 118–121° C.

EXAMPLE 3

Analogously to Example 2, 3-ethyl-6-hydroxy-7-methoxy-3',4'-methylenedioxy-flavylium chloride is hydrogenated, and the oily crude 3-ethyl-6-hydroxy-7-methoxy-3',4'-methylenedioxy-flavane is acetylated. The thus-obtained 3-ethyl-6-acetoxy-7-methoxy-3',4'-methylenedioxy-flavane (20 g.), which is likewise oily, is stirred for 45 minutes at room temperature in 400 ml. 5% methanolic potassium hydroxide solution. The reaction mixture is poured into ice water, acidified with concentrated hydrochloric acid, and extracted with chloroform. The crude product, obtained from the organic phase in a conventional manner, is chromatographed on silica gel and then recrystallized from methanol. There is obtained 3-ethyl-6-hydroxy-7-methoxy-3',4'-methylenedioxy-flavane, M.P. 79–81° C.

Analogously, from the corresponding flavylium chloride, 3-n-propyl-6-hydroxy-7,4'-dimethoxy-flavane, M.P. 50–53° C. is obtained.

EXAMPLE 4

3-methyl-6-benzyloxy-7,4'-dimethoxy-3-flavene (2 g.) is hydrogenated on 500 mg. Raney nickel in 20 ml. ethanol until the stoichiometric amount of hydrogen is absorbed (2 mols). The catalyst is filtered off, the solvent is removed under reduced pressure, and the reaction mixture is recrystallized from methanol, there being obtained 3-methyl-6-hydroxy-7,4'-dimethoxy-flavene having a melting point of 139–140° C.

EXAMPLE 5

3-methyl-6-acetoxy-7-methoxy - 3',4'-methylenedioxy-3-flavene (2 g.) is dissolved in 50 ml. ethyl acetate and shaken in the presence of 500 mg. 10% palladium charcoal, under an initial pressure of 2.5 atmospheres, with hydrogen until the pressure drop ceases. The reaction mixture is worked up analogously to Example 4 and, after recrystallization from methanol, there is obtained 3- methyl-6-acetoxy-7-methoxy - 3',4' - methylenedioxy-flavane, M.P. 136–138° C.

EXAMPLE 6

(a) 3-ethyl-6 - tetrahydropyranyl - (2)-oxy-7,4'-dimethoxy-flavanone (2.4 g.) is dissolved in 100 ml. dioxane, mixed with 1.2 g. palladium chloride, and shaken at room temperature until the stoichiometric amount of hydrogen (2 mols) is absorbed. The catalyst is filtered off, the reaction mixture concentrated under reduced pressure, diluted with water, and again concentrated to remove the residual dioxane. The oily crude 3-ethyl-6-tetrahydropyranyl-(2)-oxy-7,4'-dimethoxy-flavane is boiled dor 3 hours with 50 ml. 5% aqueous-ethanolic hydrochloric acid. After cooling, the reaction mixture is worked up with chloroform and water, obtaining after recrystallization from methanol, 3-ethyl-6-hydroxy-7,4'-dimethoxy-flavane.

(b) With agitation, 3 g. 3-ethyl-6-hydroxy-7,4'-dimethoxy-flavane and 4 g. amidosulfonic acid are introduced into 16 ml. dry pyridine heated to 90° C., and the reaction mixture maintained at 90° C. for 3 hours. After cooling, 50 ml. absolute ether is added. The ether layer is decanted off, and the remaining precipitate is mixed with a mixture of 45 ml. 12% sodium hydroxide solution and 30 ml. dry pyridine; two layers are formed. The pyridine phase is separated, washed twice with a small amount of ether, taken up in methanol, concentrated by evaporation, and the residue treated with ethanol. Insoluble components are removed by suction, and the solution is filtered over basic aluminum oxide. From the concentrated filtrate, there is obtained the sodium salt of 3-ethyl-6-hydroxy-7,4'-dimethoxy-flavane-6-sulfuric acid ester.

(c) A solution of 2 g. 3-ethyl-6-hydroxy-7,4'-dimethoxy-flavane is 20 ml. absolute pyridine is mixed, at —25° C., with 10 ml. of a solution of phosphoric acid dibenzyl ester chloride in absolute ether, stirred for one hour at —25° C., and allowed to stand overnight at —5° C. The reaction mixture is stirred into glacial acetic acid, acidified with hydrochloric acid, extracted with ether, and dried over sodium sulfate. The residue obtained from the ether solution is dissolved in 100 ml. methanol. After adding 180 mg. 10% palladium charcoal, the reaction mixture is hydrogenated until the absorption of hydrogen is terminated. The catalyst is filtered off, the reaction mixture concentrated by evaporation, and there is obtained the 3-ethyl-6-hydroxy-7,4'-dimethoxy-flavane-6-phosphoric acid ester, which can be converted into the ammonium salt thereof by dissolving this ester in aqueous ammonia and concentrating by evaporation.

EXAMPLE 7

Under a pressure of 40 atmospheres, 2 g. 3-ethyl-6-acetoxy-7-methoxy-flavone is hydrogenated for 4 hours with 0.5 g. Raney nickel in 50 ml. ethanol at 120° C. The reaction mixture is allowed to cool, the catalyst is filtered off, and the filtrate is concentrated until there crystallizes 3-ethyl-6-acetoxy-7-methoxy-flavane, M.P. 125–127° C.

EXAMPLE 8

Analogously to Example 1, the following compounds are obtained by hydrogenating the corresponding flavylium chlorides:

3-isopropyl-6-hydroxy-7-methoxy-flavane
3-n-propoxy-6-hydroxy-7-methoxy-flavane
3-isopropoxy-6-hydroxy-7-methoxy-flavane
3-isopropyl-6-hydroxy-7,4'-dimethoxy-flavane
3-n-propoxy-6-hydroxy-7,4'-dimethoxy-flavane
3-isopropoxy-6-hydroxy-7,4'-dimethoxy-flavane
3-isopropyl-6-hydroxy-7-methoxy-3',4'-methylenedioxy-flavane
3-n-propoxy-6-hydroxy-7-methoxy-3',4'-methylenedioxy-flavane
3-isopropoxy-6-hydroxy-7-methoxy-3',4'-methylenedioxy-flavane
3-methyl-6-hydroxy-7-methoxy-4'-ethoxy-flavane
3-methyl-6-hydroxy-7-methoxy-4'-isopropoxy-flavane
3-methyl-6-hydroxy-7-methoxy-4'-isobutoxy-flavane
3-methyl-6-hydroxy-7-methoxy-4'-isoamyloxy-flavane.

EXAMPLE 9

Analogously to the procedure described in Example 2, there are obtained by heating crude 3-ethoxy-6-hydroxy-7,4'-dimethoxy-flavane with the corresponding acid chloride or acid anhydride in the presence of pyridine for several hours: the 6-propionate, 6-butyrate, 6-isobutyrate, 6-valerate, 6-isovalerate, 6-trimethylacetate, 6-capronate, 6-isocapronate, 6-picolinate, 6-nicotinate and 6-isonicotinate of 3-ethoxy-6-hydroxy-7,4'-dimethoxy-flavane.

EXAMPLE 10

Heating of crude 3-ethoxy-6-hydroxy-7,4'-dimethoxy-flavane with an equimolar amount of chloroacetyl chloride in pyridine, isolation of the crude 6-chloroacetate and reaction of same with one equivalent of diethylamine in benzene at room temperature yields the hydrochloride of 3-ethoxy-6-diethylaminoacetoxy-7,4'-dimethoxy-flavane.

EXAMPLE 11

Filtration of an aqueous solution of the sodium salt of 3-ethyl-6-hydroxy-7,4'-dimethoxy-flavane-6 - sulfuric acid ester over a column of a weakly acidic cation exchanger (f.e. Amberlite IRC 50) into an aqueous solution containing the calculated amount of triethanolamine and evaporation to dryness furnishes the triethanolammonium salt of 3-ethyl-6-hydroxy-7,4'-dimethoxy-flavane-6 - sulfuric acid ester.

Similarly, the mono- and diethanolammonium, methyl-, dimethyl- and trimethylammonium salts of said sulfuric acid ester are obtained.

EXAMPLE 12

The new starting compounds of Examples 1 to 3 are prepared as follows:

Dry hydrogen chloride is introduced into a solution of 168 g. 2,5-dihydroxy-4-methoxy-benzaldehyde and 164 g. p-methoxy-propiophenone in 800 ml. formic acid at 0° C. until the solution is saturated. The mixture is set aside at a cool place over night. The precipitated 3-methyl-6-hydroxy-7,4'-dimethoxyflavylium chloride is filtered. It can be recrystallized from 6% hydrochloric acid but is preferably hydrogenated in the crude state. The orange-red salt is characterized by its absorption spectrum (in ethanol): $\lambda_{max}$. 455, 334, 287, 252 and 231 nm.

($E_{1cm}^{1\%}$. 1027, 135, 355, 448 and 769)

Analogously, the following flavylium chlorides are prepared:

3-methyl-6-hydroxy-7-methoxy-
3-methyl-6-hydroxy-7-methoxy-3,4-methylenedioxy-
3-ethyl-6-hydroxy-7-methoxy-
3-ethyl-6-hydroxy-7,4'-dimethoxy-
3-ethyl-6-hydroxy-7-methoxy-3',4'-methylenedioxy-
3-n-propyl-6-hydroxy-7-methoxy-
3-n-propyl-6-hydroxy-7,4'-dimethoxy-
3-n-propyl-6-hydroxy-7-methoxy-3',4'-methylenedioxy-
3,7-dimethoxy-6-hydroxy-
3,7,4'-trimethoxy-6-hydroxy-
3,7-dimethoxy-6-hydroxy-3',4'-methylenedioxy-
3-ethoxy-6-hydroxy-7-methoxy-
3-ethoxy-6-hydroxy-7,4'-dimethoxy-
3-ethoxy-6-hydroxy-7-methoxy-3',4'-methylenedioxy- The following examples cover suitable pharmaceutical compositions which can be prepared according to conventional methods.

EXAMPLE 13.—TABLETS

|  | Mg. |
|---|---|
| 3-ethoxy-6-hydroxy-7,4'-dimethoxy-flavane | 5 |
| Lactose | 60 |
| Corn starch | 25 |
| Talc | 8 |
| Magnesium stearate | 2 |

EXAMPLE 14.—COATED TABLETS

|  | Mg. |
|---|---|
| 3-ethoxy-6-hydroxy-7,4'-dimethoxy-flavane | 10 |
| Lactose | 85 |
| Talc | 5 |

The coating consists of a mixture of cane sugar, corn starch, talc, and tragacanth. Its weight is about 100 mg.

EXAMPLE 15.—SOLUTION FOR INJECTION

A solution of 2 kg. of 3-ethyl-6-hydroxy-7,4'-dimethoxy-flavane-6-sulfuric acid ester sodium salt in 998 kg. of distilled water is prepared and filled into ampoules in such a manner that each ampoule contains 2 mg. of said sodium salt.

EXAMPLE 16.—SYRUP

A mixture of:

|  | Kg. |
|---|---|
| 3 - methyl - 6 - hydroxy - 7 - methoxy-3',4'-methylenedioxy-flavane | 0.2 |
| Glycerol (twice distilled) | 7.5 |
| Cane sugar | 56.0 |
| Methyl p-hydroxybenzoate | 0.07 |
| n-propyl-p-hydroxybenzoate | 0.03 |
| Ethanol | 10.0 |
| Fruit flavorings, as desired. | | is prepared and mixed with distilled water in such a manner that the volume of the entire preparation is 100 l. A dosage unit (5 ml.) contains 10 mg. of active substance.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A member selected from the group consisting of:
(A) a compound of the formula

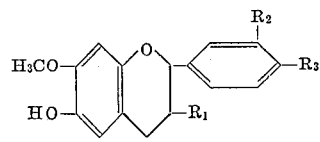

wherein:
$R_1$ represents alkyl of 1–3 carbon atoms or alkoxy of 1–3 carbon atoms;
$R_2$ is hydrogen; and
$R_3$ is hydrogen or alkoxy of 1–5 carbon atoms, or $R_2$ and $R_3$ together represent methylenedioxy;

(B) an ester of said compound wherein the acid portion of said esters is of carboxylic acids of 1–6 carbon atoms, sulfuric acid, or phosphoric acid; and
(C) a physiologically acceptable salt of said ester.

2. A member as defined by claim 1 wherein said member is said compound (A).

3. A member as defined by claim 1 wherein $R_1$ is alkyl of 1–3 carbon atoms.

4. A member as defined by claim 1 wherein $R_1$ is alkoxy of 1–3 carbon atoms.

5. A member as defined by claim 3 wherein $R_3$ represents hydrogen, methoxy or together with $R_2$, methylenedioxy.

6. A member as defined by claim 4 wherein $R_3$ represents hydrogen, methoxy or together with $R_2$, methylenedioxy.

7. A member as defined by claim 1 wherein said member is 3-methyl-6-hydroxy-7-methoxy-3',4'-methylenedioxyflavane.

8. A member as defined by claim 1 wherein said member is 3-methyl-6-acetoxy-7-methoxy-3',4'-methylenedioxyflavane.

9. A member as defined by claim 1 wherein said member is 3-ethoxy-6-hydroxy-7,4'-dimethoxy-flavane.

10. A member as defined by claim 1 wherein said member is 3-ethoxy-6-acetoxy-7,4'-dimethoxy-flavane.

11. A member as defined by claim 1 wherein said member is 3,7,4'-trimethoxy-6-acetoxy-flavane.

12. A compound of the formula

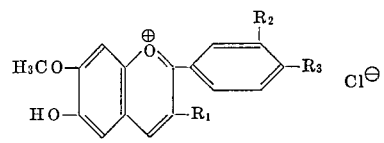

wherein:
$R_1$ represents alkyl of 1–3 carbon atoms or alkoxy of 1–3 carbon atoms;
$R_2$ is hydrogen; and
$R_3$ is hydrogen or alkoxy of 1–5 carbon atoms, or $R_2$ and $R_3$ together represent methylenedioxy.

13. A compound as defined by claim 12 wherein $R_1$ and $R_3$ represent methoxy and $R_2$ represents hydrogen.

14. A compound as defined by claim 12 wherein $R_1$ represents ethoxy, $R_2$ represents hydrogen and $R_3$ represents methoxy.

15. A compound as defined by claim 12 wherein $R_1$ represents methyl and $R_2$ and $R_3$ together represent methylenedioxy.

References Cited

FOREIGN PATENTS 6,408,925  3/1965  Netherlands _____ 260—345.5

ALEX MAZEL, Primary Examiner

JAMES H. TURNIPSEED, Assistant Examiner

U.S. Cl. X.R.

260—295, 295.5, 345.5; 424—278, 282, 283